United States Patent [19]

Gray

[11] Patent Number: 5,531,011

[45] Date of Patent: Jul. 2, 1996

[54] LONGSHOREMAN'S STACKING PIN TOOL AND PROCESS

[76] Inventor: William H. Gray, Rte. 3, Box 268, Smithfield, Va. 23430

[21] Appl. No.: 344,106

[22] Filed: Nov. 23, 1994

Related U.S. Application Data

[62] Division of Ser. No. 125,231, Sep. 23, 1993, Pat. No. 5,390,970.

[51] Int. Cl.⁶ ..................................................... B23P 19/00
[52] U.S. Cl. .......................... 29/428; 29/525.01; 410/68
[58] Field of Search .................................. 294/19.1, 1.1, 294/15, 18, 22, 23, 24, 26, 27.1, 34, 90, 92, 103.1; 15/144.3; 16/114 R, 115; 29/428, 270, 283, 525.1; 81/53.1, 53.12, 177.2, 487, 488; 403/300, 306, 308, 335, 336, 337

[56] References Cited

U.S. PATENT DOCUMENTS

| | | | |
|---|---|---|---|
| 678,898 | 7/1901 | O'Carroll | 294/22 |
| 2,687,567 | 8/1954 | Walraven | 29/270 |
| 3,469,878 | 9/1969 | De Haan | 294/19.1 |
| 4,586,741 | 5/1986 | Muti | 294/19.1 |

FOREIGN PATENT DOCUMENTS 853340  10/1952  Germany .................. 294/19.1

*Primary Examiner*—Joseph M. Gorski
*Attorney, Agent, or Firm*—Griffin, Butler, Whisenhunt & Kurtossy

[57] ABSTRACT

A tool permitting a longshoreman to install and remove stacking pins from cargo containers without the necessity of using a ladder is disclosed. The stacking pin tool includes a segmented, elongated, handle with one end segment thereof terminating in a specifically designed stacking pin engagement and retention structure for a specific design stacking pin. The longshoreman remains on the deck while engaging and retaining the stacking pin with the end of the tool, rotating the tool and pin 180° to individually position stacking pins over and in position to be inserted in each of the four reinforced corners of a cargo container. The length of the elongated handle is adjusted by adding or removing segments therein for use in one or two tier cargo container stacks. When needed, a second elongated tool, having a flashlight and mirror on one end thereof, is employed by a second longshoreman to illuminate the reinforced corner area and assist the first longshoreman, via the mirror image, to position the stacking pin within the corner opening.

4 Claims, 3 Drawing Sheets

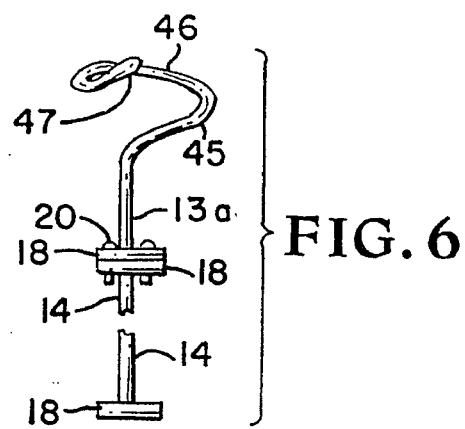
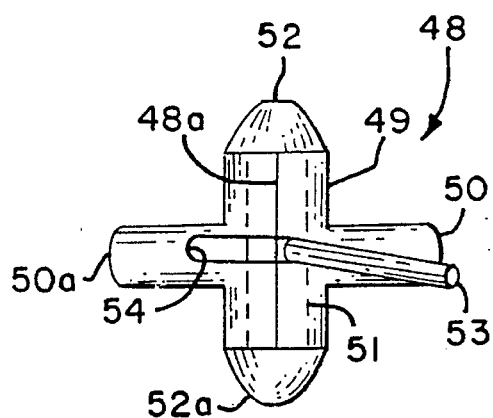
FIG. 6
FIG. 7
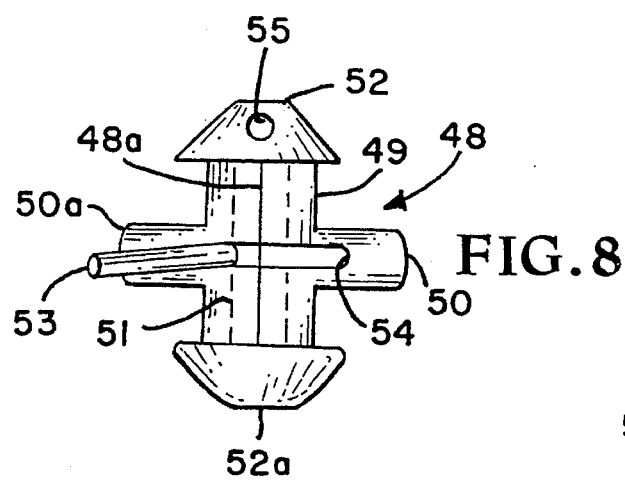
FIG. 8
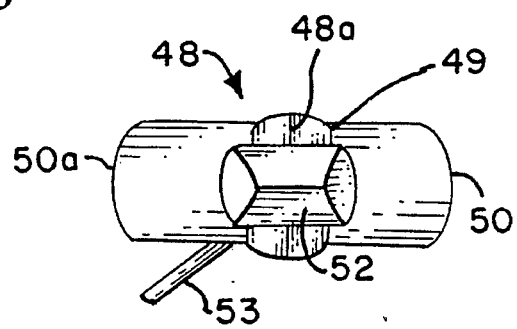
FIG. 9
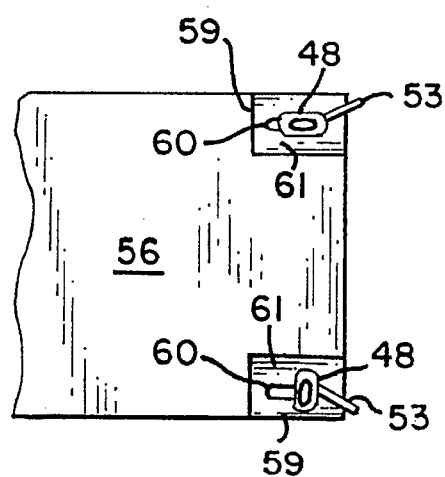
FIG. 11

LONGSHOREMAN'S STACKING PIN TOOL AND PROCESS

This application is a divisional application of application Ser. No. 125,231 of William H. Gray filed on Sep. 23, 1993, now U.S. Pat. No. 5,390,970.

FIELD OF THE INVENTION

This invention relates to cargo container handling in general, and relates specifically to a tool and process to assist a longshoreman in inserting and removing stacking pins employed in the loading and stacking of containerized cargo onboard ships and loading docks.

BACKGROUND OF THE INVENTION

The use of container ships to transport containerized cargo has become one of the primary means for shipping numerous types of cargo. Standard size containers and pierside crane systems substantially increase the productivity while reducing the manpower required, and hazards incurred, in loading and unloading freight transporting ships. Cargo containers are of two basic sizes, each essentially eight feet high, eight feet wide and either slightly less than twenty feet, or slightly less than forty feet, long. Each container is provided with metal reinforced corners at the top and bottom surfaces thereof. These metal reinforced corners provide attachment for turnbuckle attached tie down cables and are provided with openings through flat steel plates therein to receive latches on the spreader mechanism of a crane for lifting and positioning of the container onboard a ship or on a pierside dock. After a container is positioned by the crane operator, a longshoreman "latcher" releases the spreader mechanism from the container and a second longshoreman "stacking pin installer" normally places individual stacking pins in each of the exposed reinforced corners to permit stacking of a second container onto the first container.

The stacking pins serve to support the entire weight of the second "stacked" container in spaced relationship over the first container with the space therebetween permitting passage of tie-down cables. These stacking pins may vary in structural shape from ship-to-ship, and are normally six to ten inches in length, weigh from around 20 pounds each, and provided with rotatable locking extensions, or tits, that are releasably secured to adjacent reinforced corners of stacked containers.

In present practice, a ladder must be manually positioned by the pin installer at the corners to enable the longshoreman to carry each stacking pin from the deck level to the top of the container for installation thereof. This time consuming procedure results in crane inactivity while being performed, and adds safety hazards through the use of ladders. When stacking a third container onto a first stack of two containers, a longer ladder and much more time is consumed. As in most labor operations, time is money and any change in equipment or procedure to reduce the time in performing necessary tasks can result in savings to all concerned.

There is thus a definite need in the art for added equipment, or a simplified procedure, that will improve the safety and reduce the time and effort involved in loading and unloading of containerized cargo.

Accordingly, it is an object of the present invention to provide a tool that permits a longshoreman to install or remove cargo container stacking pins without the necessity of a ladder.

Another object of the present invention is a tool that can be operated by a longshoreman standing on the deck level to install or remove stacking pins from the top reinforced corners of a cargo container.

A further object of the present invention is an elongated, rigid, segmented tool support for engaging and lifting stacking pins from a deck and positioning the stacking pins in a top reinforced corner of a cargo container.

An additional object of the present invention is a tool that permits a longshoreman to remove stacking pins from the top of a cargo container while standing on a support surface for the cargo container.

Another object of the present invention is a tool that permits a longshoremen to install or remove stacking pins in the top reinforced corners of two or three tier stacked cargo containers while standing on a deck level and without the use of ladders.

Still another object of the present invention is an improved safety and reduced time process for installing and removing stacking pins from the top reinforced corners of cargo containers without requiring the longshoreman to mount a ladder.

SUMMARY OF THE INVENTION

According to the present invention the foregoing and additional objects are attained by providing a tool having a segmented, rigid, elongated, handle supporting a stacking pin engaging and retention structure on an end segment thereof. The individual segments of the handle are provided with a transverse flange on at least one end thereof to connect, via bolts, with an adjacent handle segment. The stacking pin engaging and retention structure is selected from a variety of structures with each individual structure being specific for at least one individually designed stacking pin. These structures include (1) at least one forked plate angularly oriented relative to the elongated handle and formed of a pair of spaced flat tines with pointed ends that taper into sharp leading edges; (2) a pair of spaced fork plates adapted to cradle a stacking pin; (3) a forked plate for engaging a stacking pin structure and a spaced short intermediate tine extension pin to be received by an opening in the stacking pin; and (4) an open, part circular, stacking pin engaging and retention structure having an angular tip thereon for engaging an opening in a stacking pin.

The stacking pin tool negates the need of ladders for the longshoreman to climb up on the cargo container and permits the longshoreman to grasp and retain a stacking pin at the deck level; turn the handle 180° to rotate the pin, while lifting it, via the tool, to position it atop a cargo container; and, to insert the pin into a reinforced corner of the cargo container. For removal of the stacking pins when unloading the cargo containers, the reverse procedure is employed wherein the stacking pins are individually extracted from the reinforced corner by the tool and placed on the deck level. Also, for pin installation, the stacking pins may be hand inserted into the tool retention mechanism of a stacking pin tool that is already rotated to the insertion position. In this procedure, no rotation of the tool is required and only vertical positioning of the stacking pin over the reinforced corner opening for insertion thereof is required.

BRIEF DESCRIPTION OF THE DRAWINGS

A more complete appreciation of the invention and many of the attendant advantages thereof will be more readily apparent as the same becomes better understood with reference to the following detailed description when considered in connection with the accompanying drawings, wherein:

FIG. 6 is a part side view of another modified stacking pin engagement segment;

FIG. 7 is a schematic side view of one specific type of stacking pin with the rotatable locking tit ends shown in unlocked position;

FIG. 8 is a schematic side view of the stacking pin shown in FIG. 7 and having the locking tits in locked position;

FIG. 9 is a schematic top view of the stacking pin shown in the locked position of FIG. 8;

FIG. 11 is a partial top view of one of the cargo containers shown in FIG. 10 with stacking pins therein.

DETAILED DESCRIPTION

Figure 1:
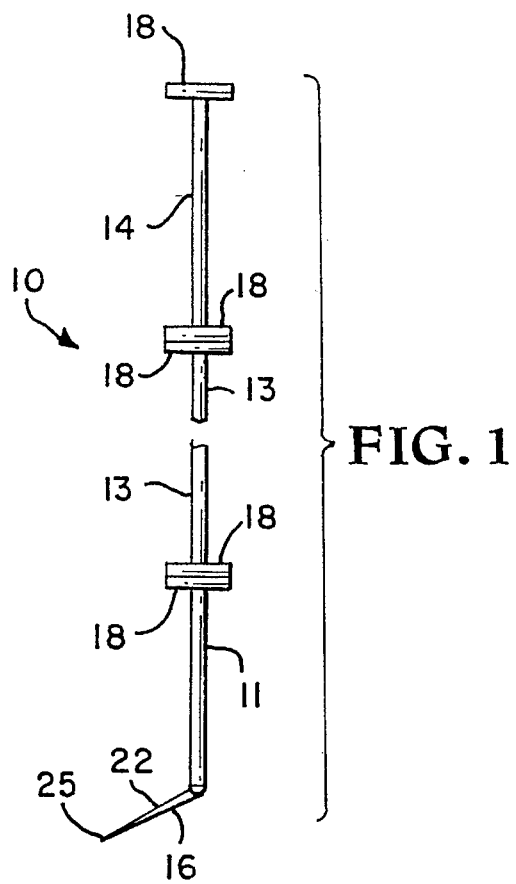
FIG. 1 is a part schematic side view of a rigid, segmented, stacking pin tool according to one aspect of the present invention.
Figure 1A:
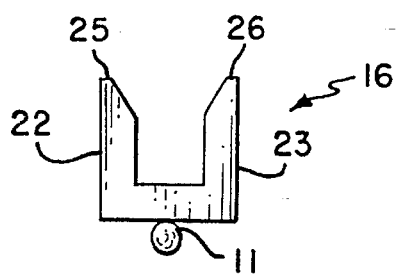
FIG. 1a is an end view of the stacking pin tool shown in FIG. 1.
Figure 2:
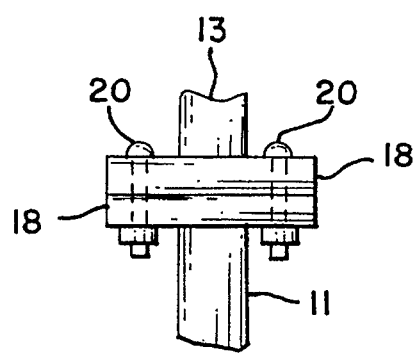
FIG. 2 is an enlarged view of the segment connection between two segments of the stacking pin shown in FIG. 1.

Referring now to the drawings, and more particularly to FIGS. 1 and 1a, the stacking pin tool of the present invention is shown and designated generally by reference numeral 10. Stacking pin tool 10 includes a rigid, elongated, handle formed of multiple segments, and provided with a stacking pin engaging and retention structure on an end segment thereof. In the illustrated embodiment, stacking pin tool 10 includes an end segment 11 and at least two additional extension segments 13, 14. As will be further explained hereinafter, for stacking pin insertion and removal from the top of a cargo container in a second tier stack, at least two extension segments are required (as in the illustration of FIG. 1), while a single tier cargo container may be served with only one extension segment required to reach the necessary height. End segment 11 is provided with a stacking pin engaging and retention structure 16 at one end thereof and an integral transverse flange 18 at the other end thereof. Each of extension segments 13, 14 are provided with identical transverse flanges 18 at each respective end thereof. Flanges 18 on engaging handle segments are bolted together via suitable bolts 20, as shown more clearly in enlarged FIG. 2, to form the elongated handle for tool 10.

Referring back to FIGS. 1 and 1a, the stacking pin engaging and retention structure 16 on tool 10 is in the form of a forked plate disposed in a plane angularly oriented relative to its integral handle segment 11 and includes a pair of spaced tines 22,23. Spaced tines 22,23 are provided with parallel outer surfaces and inner parallel surfaces over a major portion of their length. The inner parallel surfaces terminate in convergent inner surfaces over the minor length, tip end portions of retention structure 16, to define a tapered tip opening therebetween. The tip end portions of tines 22,23 have upper and lower surfaces that taper to sharp leading edges 25,26 and, the purpose of which will be further explained hereinafter.

Figures 3, 4, 5:
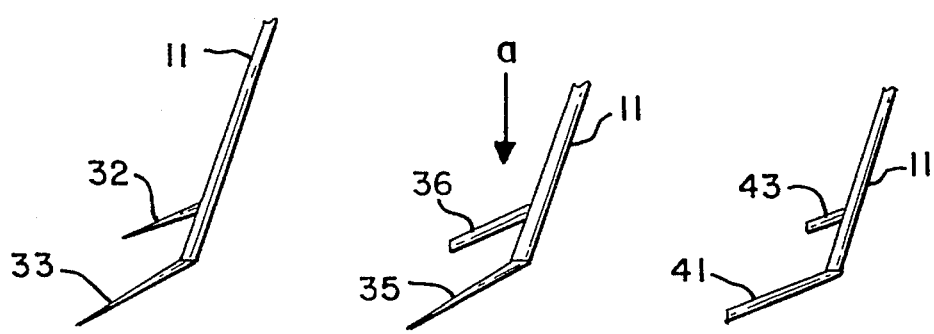
FIG. 3 is a part side view of a modified stacking pin engagement segment for a stacking pin tool similar to FIG. 1.
FIG. 4 is a part side view of another modified stacking pin engagement segment.
FIG. 5 is a part side view of still another modified stacking pin engagement segment.

Referring to FIG. 3 a part side view of a modified stacking pin engagement structure is employed. In this embodiment, end segment 11 of the tool handle is provided with a pair of spaced forked plates 32,33, each being similar in construction, appearance and function, to fork plate 16 described hereinabove.

Figure 4A:
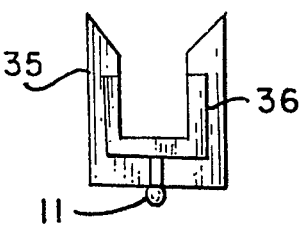
FIG. 4a is a partial view of the modified stacking pin engagement pin segment shown in FIG. 4 and looking in the direction of arrow "a" therein.

In FIG. 4, a part side view of another modified stacking pin engagement structure is shown. FIG. 4a illustrates an end view of the structure shown in FIG. 4. In this embodiment, end segment 11 of the tool handle is provided with an end forked plate 35, also similar in construction, appearance and function as fork plate 16 of FIGS. 1 and 1a. In addition, a spaced, blunt end, U-configured fork 36 is secured to end segment 11 in spaced parallel relationship to end fork plate 35. Each of the projections forming the blunt end U-configured fork 36 is provided with a substantially circular cross sectional area.

Figure 5A:
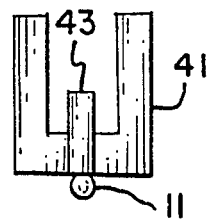
FIG. 5a is a top view of the stacking pin engagement segment shown in FIG. 5.

As shown in FIGS. 5 and 5a, the stacking pin engagement structure employed therein is formed of cylindrical stock and shaped in a U-configuration, as designated by reference numeral 41. A center projection 43 extends from the base of the U-configured stacking pin engagement structure 41. Projection 43 is in the same vertical plane as the legs of the pin engagement structure 41 and is adapted to be inserted within an opening provided in the substantial center of selected stacking pins, as will be further explained hereinafter.

Referring to FIG. 6, a modified end segment 45 for stacking pin tool 10 is illustrated and designated by reference numeral 45. End segment 45 is provided with a transverse flange 18 on one end thereof for attachment to adjacent handle segment 13, as in the previously described embodiments. The stacking pin engagement structure 46 on the end of segment 45 is of an essentially open, part circular, configuration and disposed in a substantially parallel relationship to transverse flange 18 thereon. The open, part circular, stacking pin engagement structure 46 is formed of cylindrical stock lengths, and terminates in an up-turned tip 47, as will be further explained hereinafter.

Referring now to FIGS. 7, 8 and 9, an exemplary type stacking pin configuration is shown, and designated generally by reference numeral 48.

As shown therein, stacking pin 48 is formed of two symmetrical halves (machined from suitable heavy duty steel) connected together by conventional bolts (not shown) along line 48a to form a vertical central body section 49. Central section 49 is provided with integral extending ears 50,50a extending from substantially the center thereof. An elongated shaft 51 is rotatably disposed in a central vertical passageway formed in vertical central body 49. Elongated shaft 51 is provided with a pair of latching tits 52,52a integrally secured to the ends thereof and exteriorly disposed, in rotatable relationship, with vertical central body 49. An elongated locking pin 53 is secured intermediate the ends of elongated shaft 51 and extends through a horizontal slit opening 54 provided in vertical central body 49. A portion of elongated shaft 51 is visible through slit opening 54 in FIGS. 7 and 8. Horizontal movement of locking pin 53 along horizontal slit opening 54 causes vertical shaft 51 and attached latching tits 52,52a to rotate from the unlocked position shown in FIG. 7 to the locked position shown in FIG. 8, as will be further explained hereinafter.

Stacking pin 48, is preferably inserted or removed by employing the stacking pin engaging and retention structure described hereinbefore in reference to FIG. 3 but, also may be inserted or removed by employing either of the stacking pin engaging and retention structures described in reference to FIG. 1, FIG. 3, FIG. 4, FIG. 5 or FIG. 6.

Stacking pin 48, is provided with a central portion 49 having integral end ear segments 50,50a, each of which is provided with flat horizontal surfaces. Each of the stacking pin engaging and retention structures described in reference to FIG. 1, FIG. 3 or FIG. 4 is provided with suitable surfaces for engaging these flat surfaces to facilitate lifting and positioning of the stacking pin for insertion or removal thereof. As shown in FIG. 8, locking tit 52 on stacking 48 is provided with an opening extending transversely therethrough, as designated by reference numeral 55. The stacking pin engaging and retention structure described in reference to FIGS 5 and 6 are provided with respective hole engagement portions 43 and 47, for insertion into opening 55, to facilitate placement or removal of stacking pin 48.

Figure 10:
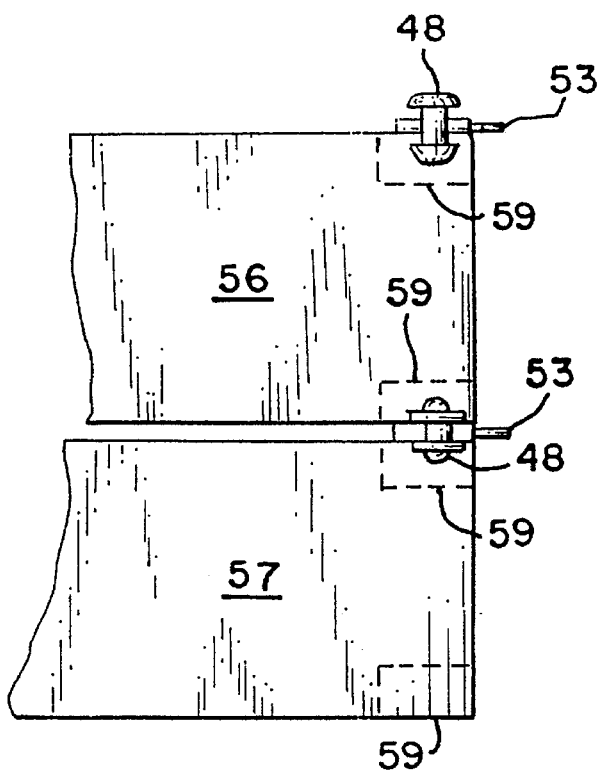
FIG. 10 is a schematic partial side view of a two tier stack of cargo containers with the stacking pins installed to receive a third tier thereon.

Referring now to FIG. 10, a schematic side view of a two tier stack of cargo containers is shown, with the top tier container being designated by reference numeral 56, and the bottom tier container designated by reference numeral 57. A top view of cargo container 56 is shown in FIG. 11. Each of reinforced corners 59 of cargo containers 56,57 is provided with a reinforced steel box structure having openings 60 in a flat steel plate closure 61 therein. Rectangular openings 60 serve to receive the latch structure on a crane spreader mechanism and to receive the stacking pins 48 permitting positioning and securing the containers in multiple tiers onboard a ship and on pierside docks. Two of the four top reinforced corners 59 for container 56 are shown in FIG. 11. Stacking pin 48, illustrated in the uppermost portion of FIG. 11 is in the unlocked mode (as in FIG. 7), while stacking pin 48, shown in the lower portion of FIG. 11, is in the locked mode (as in FIGS. 8 and 9). The bottom corners of cargo containers 56, 57 are of identical construction to that described for the top corners and are not further described herein in the interest of brevity.

One pair of top and bottom reinforced corners 59 for containers 56, 57 are shown in FIG. 10. The stacking pin 48 in the top of cargo container 56 is in unlocked position to receive a third tier of cargo container thereon, while stacking pin 48 in the bottom of container 56, and extending into reinforced corner 59 in container 57, is in the locked position. Also, when the cargo is in the unloading mode onboard ship, stacking pin 48 in the top of cargo container 56 is exposed to facilitate removal thereof to permit attachment of the crane spreader latches in openings 60 of the reinforced corners 59 for lifting of cargo container 56.

Figure 12:
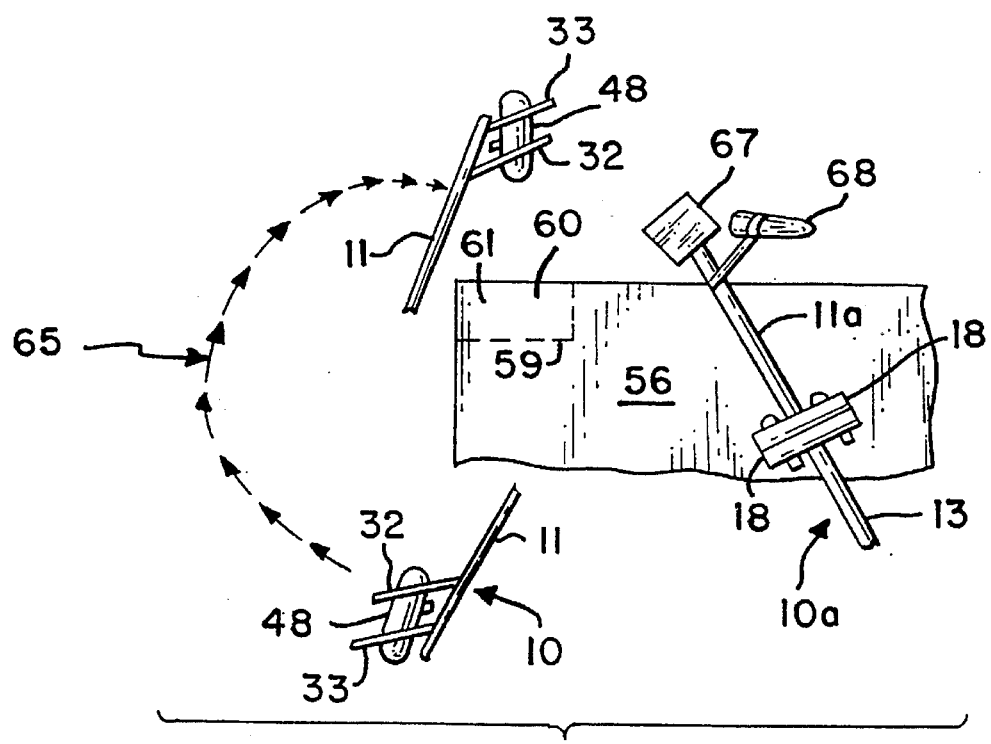
FIG. 12 is a schematic illustration, with parts broken away, and parts omitted, illustrating a method of employing the stacking pin tool of the present invention to insert a stacking pin in one of the reinforced corners on the top surface of a cargo container.

Although the operation of the longshoreman's stacking pin tool of the present invention is believed apparent from the foregoing description, further explanation thereof will be described in reference to FIG. 12. As shown therein, a stacking pin tool (the embodiment of FIG. 3) engages a stacking pin 48 by placing the forked plates in engagement with flat surfaces on ears 50,50a so as to cradle the central portion of stacking pin 48 therebetween. Locking pin 53 on stacking pin 48 is directed toward the handle 11 of the stacking pin removal and insertion tool 10. While the longshoreman operator remains on the support level for the cargo containers, tool 10 is rotated 180°, following the arrow path 65 shown in FIG. 12, to place stacking pin 48 in position to be inserted in opening 60 in a reinforced steel plate corner 59 of a cargo container 56.

When placed in position in reinforced corners 59, the length of vertical central body 49 of locking pin 48 that extends from the flat surface on ears 50,50a is received through rectangular opening 60 in steel plate cover 61, along with locking tit 52a. After the next tier container is positioned on container 56, locking pin 53 is rotated to effect rotation of locking tits 52,52a relative to ears 50,50a and secure portions of the steel plate 61 having opening 60 therein between the locking tits and the ear extensions 50,50a. For removal, locking pin 53 is rotated in the reverse position to move locking tits 52,52a back to perpendicular relationship with ears 50,50a and permit removal of stacking pin 48 from the reinforced corner.

When unloading a ship, the stacking pins 48 are removed by a reverse process to permit attachment of the crane spreader latches. The sharp leading edges on the tapered points of the fork plate 32 (FIG. 12) assist in getting under the center section of a stacking pin 48 during the unloading procedure. This is particularly helpful in engaging stuck stack pins or removing any accumulated debris therearound.

The length of stacking pin tool 10 is determined by the number of segments employed for the elongated handle. For a single tier, or for inserting or removing stacking pins 48 from cargo container 57 (FIG. 10) only a single, three or four foot, segment 13 (FIG. 1) need be employed, which, with the eighteen inch end segment 11, provides a length of approximately four and one-half to five and one-half feet, which is more than adequate to insert stacking pins 48 in corners of an eight foot high cargo container by an average height longshoreman. Additional segments 13, 14 (FIG. 1 ) are employed to extend stacking pin tool 10 to the length necessary to insert or remove stacking pins to the second tier cargo container 56.

Under twilight, or reduced light conditions, the longshoreman may have a problem in depth perception and find it difficult to locate the openings 60 in the reinforced corners for insertion of the stacking pins. To alleviate this situation a special end segment 11a is provided on a second elongated handle tool 10a and positioned by a second longshoreman. End segment 11a supports a mirror 67 and a flashlight 68 on the end thereof opposite to the end having transverse flange 18 thereon. Flashlight 68 serves to illuminate the corner opening 60 and the longshoreman controlling insertion of the stacking pin locates opening 60 by looking into mirror 67 and positions the stacking pin accordingly.

Although no specific materials have been described for making tool 10, it is to be understood that the material selected must be rigid and capable of supporting and maneuvering the around 20 pound weight of the stacking pins. In a specific embodiment of the invention, one-half inch reinforcing steel rods were employed for the individual segments with the transverse flanges being made of steel alloy plate and welded to the ends of the rod segments. The stacking pin engaging and retention structures may be constructed of any suitable material capable of supporting the loads including stainless steel plate, iron rods, other metals or composite structures.

As mentioned hereinbefore, the ears 50, 50a of the stacking pins normally have a thickness that leaves at least one inch spacing between containers at the stacking pin area when the pins are received in the three-to-four inch deep space within reinforced corners 59. Openings 60 are approximately two and one-half inches wide by four and three-quarters inches long to permit some variation in the spreader latch, as well as the cargo container sizes.

There are obviously many variations and modifications of the present invention that will be readily apparent to those skilled in the art in the light of the above teachings. For example, the different stacking pin engagement and support structures for tool 10 are given as illustrative examples for use with presently known stacking pin configurations and are not to be deemed as all inclusive. Different engagement and support configurations may be necessary for other stacking pins not expressly shown and described herein and are to be deemed as included in the present invention herein.

Also, the stacking pins may be individually hand placed in the stacking pin engaging and retention structure at the deck level after tool 10 is rotated to the position required for insertion and the tool, and the engaged pin, vertically lifted to insert the stacking pin in operative position within a reinforced cargo container corner.

It is therefore to be understood that, within the scope of the appended claims, the invention may be practiced other than as specifically described herein.

What is claimed as new and desired to be secured by Letters Patent of the United States is:

1. A method of inserting a stacking pin in a top reinforced corner receptacle of a cargo container while standing on a lower level comprising the steps of:

(a) providing cargo containers having reinforced corner receptacles and adapted for crane loading onto a ship or dock;

(b) providing a plurality of stacking pins adjacent one or more cargo containers on a deck of a ship or a dock where it is desired to stack one or two additional cargo containers onto each other, each of said stacking pins being provided with an elongated vertical central body portion having an integral protruding horizontal ear extending laterally outwardly from opposite sides thereof, each of said pins further including an opening therein;

(c) providing a stacking pin engaging and retention tool structure on an elongated handle member, said structure including a forked member having a pair of separated tines and a central tine disposed approximately intermediate said separated tines, with said forked member and said central tine being attached to said handle but being spaced along said handle from one another, the separated tines of said forked member serving to engage one side of the integral horizontal ear on opposite sides Of the vertical central body portion, and the central tine serving to engage in the opening of said pin;

(d) contacting and engaging one vertically disposed stacking pin with the stacking pin engaging and retention tool while said stacking pin is on said deck, with said forked member engaging one side of the horizontal ear thereof on said opposite sides of the central body portion and the central tine engaging in the opening of said stacking pin;

(e) employing the elongated handle member, thereby lifting from the deck, and rotating, the engaged stacking pin approximately 180° overhead;

(f) positioning the engaged stacking pin over one of the top reinforced corner receptacles of a cargo container;

(g) inserting the stacking pin in a reinforced corner receptacle; and, then (h) removing the stacking pin engaging and retention tool structure from engagement with the stacking pin.

2. The method of claim 1 including providing the elongated handle in multiple segments and wherein additional segments are added to extend the handle length to permit insertion of stacking pins to at least a second cargo container stacked onto a first cargo container when it is desired to add a third cargo container to the stack.

3. The method of claim 1 including providing a second elongated handle tool having a mirror and a flashlight attached to an end thereof and employing the services of an additional person to position the second elongated handle tool to assist the operator of the stacking pin engaging and retention tool in visually locating the stacking pin receiving opening in the reinforced corner receptacles under reduced light conditions.

4. The method of claim 1 including repeating steps (d), (e), (f), (g) and (h) until all exposed reinforced corner receptacles in each of the cargo containers that is to have another cargo container stacked thereon are provided with stacking pins.

* * * * *